Aug. 23, 1938.    R. H. STONE    2,127,849

LEAK CHECK FOR HYDRAULIC BRAKES

Filed Sept. 11, 1937

R. H. Stone  INVENTOR.

BY Thomas Howe

ATTORNEY.

Patented Aug. 23, 1938

2,127,849

UNITED STATES PATENT OFFICE 2,127,849

LEAK CHECK FOR HYDRAULIC BRAKES

R. Harry Stone, Bound Brook, N. J., assignor to Titeflex Metal Hose Co., a corporation of New Jersey Application September 11, 1937, Serial No. 163,400

5 Claims. (Cl. 303—84)

This invention relates to fluid-controlled mechanisms to automatically operate a safety device for the purpose of stopping the flow of the pressure fluid, should a break or leakage occur in the fluid transmission system.

The invention is particularly applicable in combination with hydraulic braking systems for motor vehicles and it has for its main objects the provision of a safety device which is reliable in operation, safe against the action of the fluid pressure, simple in structural design and economical in its production.

For a full understanding of the invention reference is to be had to the following description and the accompanying drawing, in which.

Figure 1:
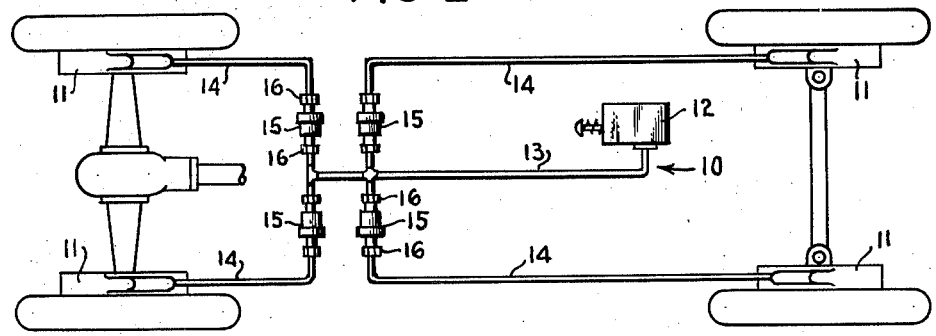
Fig. 1 is a plan outline of portions of a motor vehicle, provided with a four-wheel hydraulic brake system, incorporating valves constructed according to the invention.

The hydraulic brake system 10, illustrated in Fig. 1, is shown connected with the four brakes 11 on the four wheels of an automobile and comprises the conventional foot-operated master cylinder 12, wherewith to apply the required hydraulic brake pressure. The fluid in cylinder 12 is conducted through a main pipe 13, which connects with four branch pipes 14, leading to the four respective brakes 11 of the vehicle.

In the outline of Fig. 1, each branch pipe 14 is provided with a safety device 15, to be described hereafter, and which serves the purpose to stop the flow of the pressure fluid in case of a leak or a rupture in one of the pipes and to thereby localize drainage of the fluid in only that particular pipe, which is the cause of the drain. Each safety device 15 is connected to the main pipe and an end of a branch pipe 14 by suitable couplings 16. A single safety device thus controls the operation of one brake each.

It is evident however, that the hydraulic system may also have an arrangement wherein two branch pipes can be connected to only one safety device 15. In such a case, one pair of pipes having only one safety device, would lead to the front wheel brakes and another pair of pipes with a single safety device, would join with the rear wheel brakes, so that if a drain occurs in either pair of branch pipes, a single safety device will stop the operation of two instead of only one wheel brake.

Figure 2:
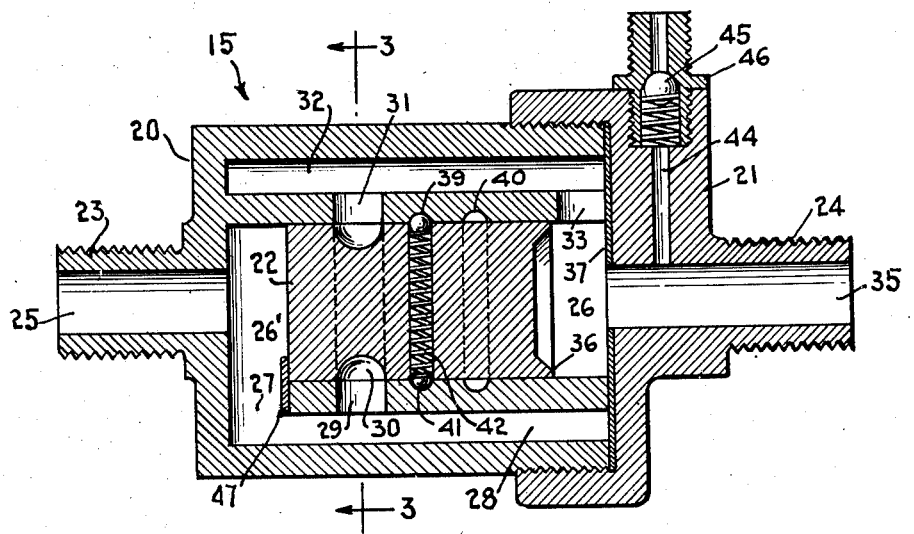
Fig. 2 is a sectional side view of a valve embodying the invention.
Figure 3:
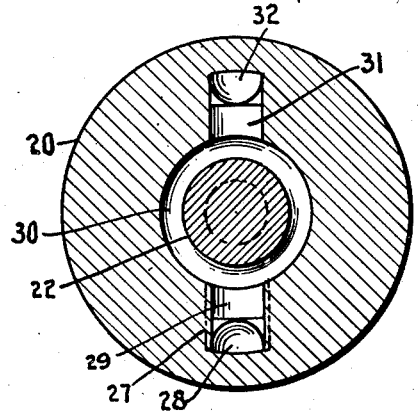
Fig. 3 is a sectional view on line 3—3, Fig. 2.

Both arrangements of safety control are well known to those versed in the art and the invention shown in Figs. 2 and 3 may of course be applied to either arrangement.

The safety device or valve illustrated in Figs. 2 and 3, comprises three principal parts or members. These are the cylinder 20, the cylinder head 21 and the piston 22. Cylinder 20 has at its closed end-part a threaded coupling nipple or extension 23, which is connected, by a coupling 16, to the main pipe 13 of Fig. 1. The other end-part of cylinder 20 is provided with the cylinder head 21, which may be screwed onto the cylinder or fastened to same in any other suitable manner. The extreme end-part of head 21 comprises a threaded coupling nipple or extension 24, to be connected by a coupling 16 to a branch pipe 14 of the hydraulic system.

Cylinder 20 is provided with a pressure fluid supply port 25, leading into a piston chamber having the front portion 26 and a rear portion 26', having a channel port 27 of an axially directed supply channel 28. A passage 29 leads from the supply channel to a piston groove or channel 30 on the circumference of the piston 22. Located opposite and in line with passage 29 and the piston groove 30 is provided a transmission passage 31 which connects the piston groove with an axially directed fluid transmission channel 32 leading towards the cylinder head 21 and permitting the fluid to enter the rear part of the piston chamber by a channel port 33. The fluid will pass from this part of the piston chamber into the transmission port 35 and from there into a branch pipe 14.

It is evident that if the fluid pressure is the same in both end-parts of the piston chamber, the piston 22 will be retained in the position shown in the drawing, and this by reason of the connections provided between the axially directed channels 28 and 32. Should one of the branch pipes 14 be damaged however and cause an escape of its fluid, the pressure at the supply port 25 will push the piston toward the transmission port 35, closing the same and preventing the remainder of the fluid in the hydraulic system from being lost and wasted.

The piston end, facing the cylinder head 21, is provided with a suitable valve seat 36 to be pressed against a resilient stop 37, which in the present construction also acts as a gasket to provide a fluid-tight joint between the cylinder 20 and its head 21. When the piston has been moved out of its normal position and is pressed against the cylinder head, it not alone closes the two passages or channel openings 29, 31, interrupting a flow between the same, but it also covers the channel port 33, in addition to closing the transmission port 35.

It will thus be seen that the device illustrated, provides a reliable closure of a branch of the main pipe and effectively prevents a leakage or drain from the remainder of the hydraulic system. The piston not only closes the transmission port 35, but also shuts out the channel 32, normally serving as an intermediary conduit between the respective supply and transmission ports 25 and 35.

Due to the provision of this transmission channel and its two passages or ports 31, 33 and of which the latter are spaced relative to the length of that part of the piston provided with the valve seat 36, the closing of both ports 31, 33 takes place simultaneously. The result is that, throttling taking place at two places, the pressure will be built up back of the piston more rapidly and the transmission port more promptly closed.

In order to maintain the piston from accidental displacement in either a normal position or in a closed position, a ball-catch is provided engaging suitable grooves 39 or 40 located on the surface of the piston chamber and situated for the respective positions referred to. This ball-catch comprises two opposingly located balls 41 which are held in the piston and are pressed outwardly by a diametrically directed helical spring 42.

After the defective branch pipe has been repaired and the piston is supposed to be returned into normal position, the operator will refill this pipe by pressing the fluid into an emergency port 44, past a check valve 45 operatively held in a threaded nipple 46, forming a part with the cylinder head 21. Sufficient pressure behind the fluid thus passed into the transmission port 35 will therefore return the piston into normal position. A stop 47 prevents the piston from moving too far to the left (Fig. 2).

It will be seen that the safety device described, provides an extremely simple and at the same time quite efficient mechanism. It gradually and definitely cuts off a leaking pipe and maintains the remainder of the hydraulic system in operation without causing any losses in slow leakage in the closed device itself.

In the mechanism shown, it is of course understood, that various changes may be made, without however departing from the scope of the invention as defined in the claims. For instance two cylinder heads instead of only one may be employed if so desired, or instead of only one supply channel 27 and one transmission channel 32, several of such channels may be provided, if convenient to do so.

Having fully described my invention, what I claim is:

1. In a device of the character described comprising a cylinder provided with a piston chamber having a supply port and a transmission port for pressure fluid and an axially directed channel connecting with each port, a reciprocable piston in said chamber, one end thereof facing said supply port and the other end facing said transmission port, a circumferential groove in said piston, channel openings opposite said groove for a communication of the fluid from one of said channels to the other channel and resisting means to maintain said piston in normal position, when the fluid pressure is substantially the same in both the supply and the transmission channel and to furthermore maintain said piston in abnormal position, after it has been moved by a difference in pressure in a direction away from said supply port.

2. In a device of the character described comprising a cylinder provided with a piston chamber having a supply port and a transmission port for pressure fluid and an axially directed channel connecting with each port, a reciprocable piston in said chamber, one end thereof facing said supply port and the other end facing said transmission port, a circumferential groove in said piston, channel openings opposite said groove for a communication of the fluid from one of said channels to the other channel and resisting means mounted on said piston, to maintain said piston in normal position, when the fluid pressure is substantially the same in both the supply and the transmission channel and to furthermore maintain said piston in abnormal position, after it has been moved by a difference in pressure in a direction away from said supply port.

3. In a device of the character described comprising a cylinder provided with a piston chamber having a supply port and a transmission port for pressure fluid and an axially directed channel connected with each port, a reciprocable piston in said chamber, a continuous circumferential groove in said piston, channel openings opposite said groove for a communication of the fluid from one of said channels to the other channel, a diametrically directed pressure mechanism located in said piston and grooves on the surface of the piston chamber, adapted to receive said mechanism for a definite location of said piston in either normal position or abnormal position, according to the fluid pressure conditions in said channels.

4. In a hydraulic safety device comprising a cylinder having a piston chamber, a pressure fluid supply port and a pressure fluid transmission port, a supply channel connecting with the chamber-end at the supply port and a transmission channel connecting with the chamber-end at the transmission port, a passage between the supply channel and said piston chamber and a plurality of passages between said transmission channel and said piston chamber and a piston in said chamber simultaneously opening and closing said passages and having a circumferential groove adapted to maintain a communication of the fluid between both said ports by means of said passages and said channels when the pressure in both said ports is substantially equal, and being further adapted to disrupt this communication and close said transmission port, when the pressure therein is lower than in the supply port.

5. In a hydraulic safety device comprising a cylinder having a piston chamber, a pressure fluid supply port and a pressure fluid transmission port, a supply channel connecting with said chamber at the supply-end and a transmission channel connecting with said chamber at the transmission-end of said cylinder, a passage between the supply channel and said piston chamber and a plurality of passages between said transmission channel and said piston chamber and a piston in said chamber simultaneously opening and closing said passages and having a circumferential groove adapted to maintain a communication of the fluid between both said ports, by means of said passages and said channels when the pressure in both said ports is substantially equal, and being further adapted to disrupt this communication, close said transmission port, when the pressure therein is lower than in the supply port, and to entirely cut off the transmission channel, to provide an effective closure against leakage from said supply port and channel.

R. HARRY STONE.